United States Patent
Ma (10) Patent No.: US 9,230,308 B2
(45) Date of Patent: Jan. 5, 2016

(54) METHOD AND APPARATUS FOR REMOVING ARTIFACTS FROM AERIAL IMAGES

(75) Inventor: Zhenkui Ma, Kent, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 342 days.

(21) Appl. No.: 13/173,089

(22) Filed: Jun. 30, 2011

(65) Prior Publication Data

US 2013/0004065 A1    Jan. 3, 2013

(51) Int. Cl.
*G06K 9/00* (2006.01)
*G06T 5/00* (2006.01)
*G06T 5/50* (2006.01)
*G06T 7/40* (2006.01)

(52) U.S. Cl.
CPC . *G06T 5/005* (2013.01); *G06T 5/50* (2013.01); *G06T 7/408* (2013.01); *G06T 2207/10036* (2013.01); *G06T 2207/20076* (2013.01); *G06T 2207/30192* (2013.01)

(58) Field of Classification Search
None
See application file for complete search history.

(56) References Cited

U.S. PATENT DOCUMENTS

| | | | | |
|---|---|---|---|---|
| 5,332,968 A * | 7/1994 | Brown | | 324/309 |
| 5,612,901 A | 3/1997 | Gallegos et al. | | |
| 5,640,468 A * | 6/1997 | Hsu | | 382/190 |
| 6,351,717 B2 * | 2/2002 | Lambrecht | | 702/97 |
| 7,184,890 B2 | 2/2007 | Boright et al. | | |
| 7,912,296 B1 | 3/2011 | Zelinka et al. | | |
| 2003/0072496 A1 | 4/2003 | Woodell et al. | | |
| 2005/0175253 A1 * | 8/2005 | Li et al. | | 382/260 |
| 2005/0195096 A1 | 9/2005 | Ward et al. | | |
| 2010/0046843 A1 * | 2/2010 | Ma et al. | | 382/224 |
| 2011/0043402 A1 * | 2/2011 | Sasakawa | | 342/25 A |

* cited by examiner

*Primary Examiner* — Eueng-Nan Yeh
(74) *Attorney, Agent, or Firm* — Perkins Coie LLP

(57) ABSTRACT

A computer system for creating artifact-free aerial images of a region of interest. A computer system receives one or more input aerial images that are obtained at different times. A false-color image is created by applying two or more of the input aerial images to different color channel inputs of the false-color image. Based on the color of the pixels in the false-color image, pixels in the two or more input aerial images are classified as representing clear, cloud or shadow areas. An output image is created by combining pixels that are classified as representing clear areas from two or more of the input aerial images.

5 Claims, 5 Drawing Sheets

METHOD AND APPARATUS FOR REMOVING ARTIFACTS FROM AERIAL IMAGES

TECHNICAL FIELD

The disclosed technology relates to remote sensing techniques, and in particular to systems for enhancing aerial images.

BACKGROUND

As an alternative to sending survey crews to physically inspect land parcels, many forest management companies and other landholders are utilizing remotely sensed images such as, satellite or other aerial images of one or more regions of interest to inspect such land holdings. The aerial images can be analyzed to manage the growth or harvesting of trees or crops in the area, to inspect a site for naturally caused damage such as from fire, flooding or insects, to detect trespassing or theft of inventory and for other purposes.

While remote sensing has proved significantly valuable to landholders, such aerial images often contain atmospheric artifacts namely, clouds that obscure ground features. While clouds are easy to identify in an image based on their bright reflectance values, the shadows in an image that are caused by clouds are often mistaken for densely growing forests and can be difficult to detect and remove with a computer program.

DETAILED DESCRIPTION

To address the above mentioned concerns and others, the technology disclosed herein relates to a computer system having one or more processors that are programmed to remove artifacts such as clouds and shadows from aerial images of a region of interest. A computer system receives two or more input aerial images of a region of interest that are temporally displaced (i.e., that are obtained at different times). A false-color composite image is created by applying the two or more aerial images to different color channels of the composite image. Based on the color of the pixels produced in the false-color image, a programmed processor determines if the corresponding pixels in the input images are clear or contain an artifact. An output aerial image is then created by combining clear pixels from each of the two or more input aerial images to create an artifact-free composite output image.

Although the disclosed technology is discussed in relation to its use in forestry applications, it will be appreciated that the technology can be used for other purposes such as analyzing aerial images for agriculture, geography, weather, intelligence or other disciplines where it is desirable to view artifact-free aerial images.

Figure 1:
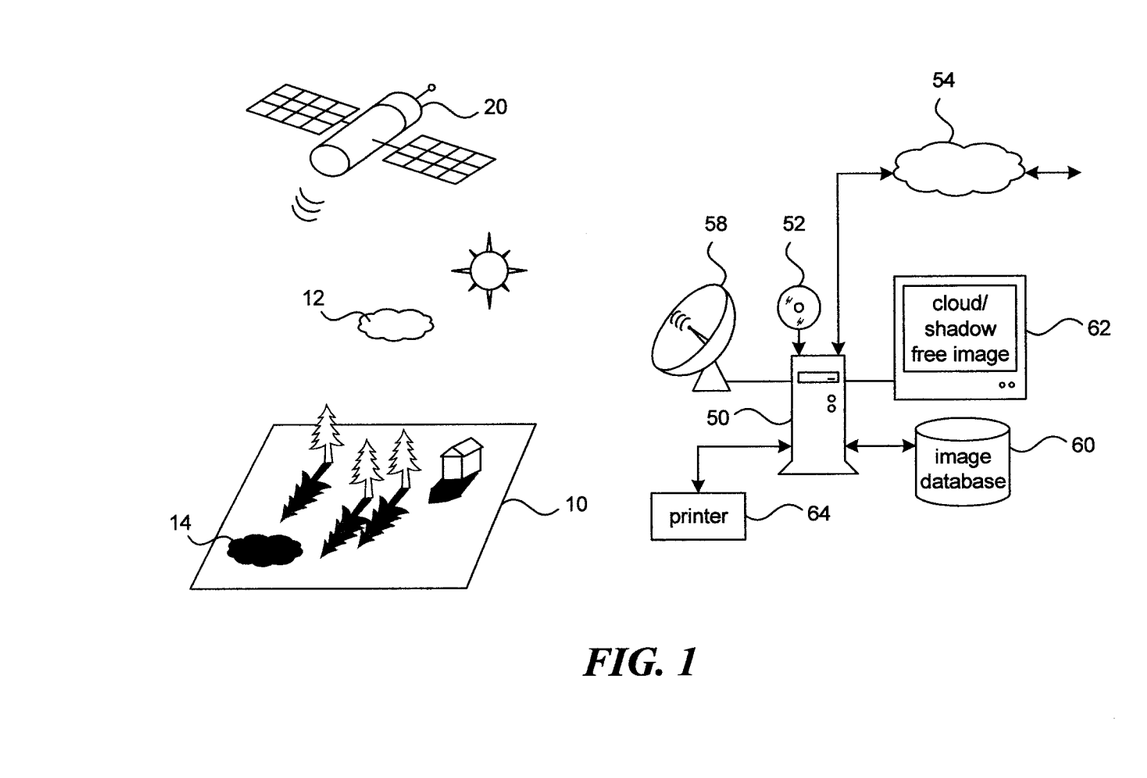
FIG. 1 is a block diagram of a remote imaging system in accordance with an embodiment of the disclosed technology.

FIG. 1 illustrates a system for creating artifact-free aerial images of a region of interest 10 in accordance with an embodiment of the disclosed technology. The region of interest 10 may comprise forest lands, farm lands, oceans, beaches or other areas. In addition, the disclosed technology could also be used for creating artifact-free images of extraterrestrial objects such as planets or the like. In one embodiment, a satellite system 20 such as the Landsat™ system operated by the U.S. Geological Service, captures images of a region of interest. The Landsat™ satellite system captures images in a number of spectral bands ranging from the mid-infrared band to the visible bands. As will be appreciated, the aerial images are not limited to satellite images but may come from other sources such as aircraft, weather balloons or other airborne imaging systems. Pixel data for each spectral band in an image is transmitted via a satellite or other communication link to a remotely located computer 50. In some embodiments, the image data, like Landsat™ image data, includes other data such as the angle of the sun and a measure of atmospheric conditions that were present when an image was taken. This additional data allows images taken at different times to be adjusted for differences in these parameters.

As indicated above, one problem with aerial images is the presence of artifacts such as, clouds, cloud shadows, aircraft contrails etc., that obscure the ground features in the image. In the example shown in FIG. 1, a cloud 12 is present in an aerial image and creates a corresponding shadow 14 that also appears in the image. Clouds are generally easy to identify in an image by their color and bright intensity. However, shadow regions 14 are often more difficult to identify and are often confused with dense forest regions.

In one embodiment of the disclosed technology, a processor within the computer system 50 executes a sequence of programmed instructions that are stored on a non-transitory, computer readable media such as a CD, DVD, hard drive, etc. Alternatively, the instructions can be received via a computer communication link 54 such as the Internet. The instructions cause the processor to receive one or more temporally spaced images of a region of interest via a satellite link 58 a computer communication link 54 such as the Internet or from a computer readable storage media. The processor may store the aerial images of the region of interest in an image database 60.

The processor is programmed to analyze the aerial images to remove clouds/shadows or other obstructing artifacts in the images by combining clear pixels from each of the two or more temporally spaced aerial images. Such input images may be taken several hours, days or longer periods apart. Preferably, the aerial images are taken under similar illumination conditions and at times that are sufficiently close together so that the ground features (e.g., vegetation, buildings, geographic features etc.) do not appear significantly different in each of the aerial images. In one embodiment, the processor is programmed to normalize the images in order to correct for differences in atmospheric affects and solar angles. Such normalization is considered well known to those of ordinary skill in the art of remote sensing.

The composite output aerial image can be stored in the database 60, can be transmitted to a remote computer system via the computer communication link 54, can be displayed on a computer monitor 62 or printed using a printer 64 or other output mechanism.

Figure 2:
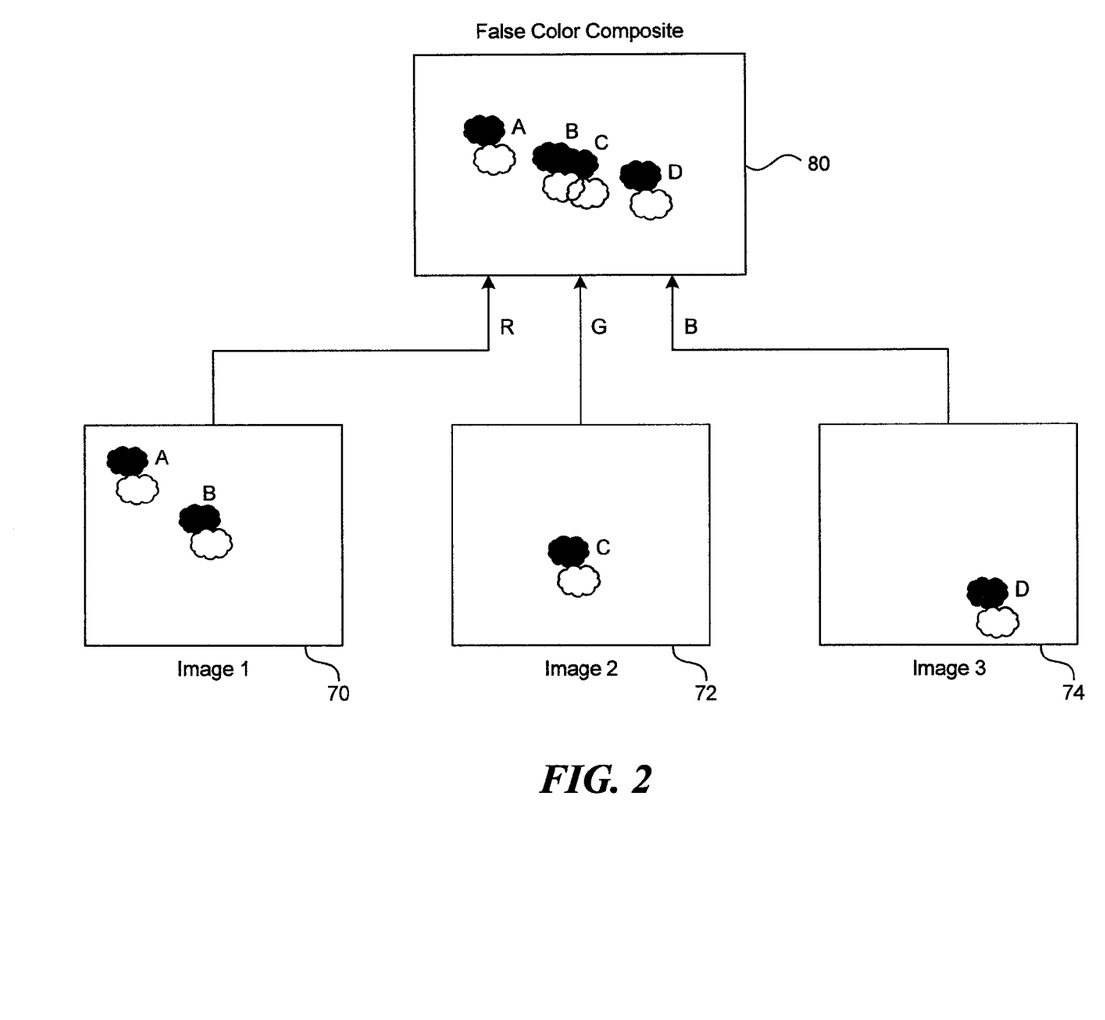
FIG. 2 illustrates how a false-color composite image is created from two or more input images of a region of interest in accordance with an embodiment of the disclosed technology.

FIG. 2 illustrates a series of temporally spaced aerial images of a region of interest. A first image 70 contains clouds and associated shadow regions labeled A and B. A second aerial image 72 includes a cloud and shadow region labeled C while a third aerial image 74 includes a cloud/shadow region labeled D.

In one embodiment, a selected band of each of the temporally spaced aerial images 70, 72, and 74 is applied to separate color channels of an image to produce a false-color composite image 80 that contains each of the cloud/shadow regions A-D. In one embodiment, a selected band of input image 70 is applied to a red channel of the false-color image, a selected band of input image 72 is applied to the green channel input and a selected band of input image 74 is applied to the blue channel input of the false-color image.

As will be appreciated by those of ordinary skill in the art, the colors displayed at any pixel location in the false-color image depend upon the relative intensity of each of the corresponding pixels that are applied to the color channel inputs. Because clouds tend to appear as pixels having relatively high intensities compared with their surroundings, the colors of the clouds in the false-color image are indicative of which image contains the cloud. For example, if a cloud region appears as a bright red color region in the false-color image, then it can be determined that the cloud only appears in the image supplied to the red color channel. Similarly, if a cloud appears as a bright blue region in the false-color image, then it can be determined that the cloud only appears in the image 74 supplied to the blue color channel. If clouds in the temporally spaced input images overlap (i.e., a cloud was in the same location when both temporally spaced images were obtained), then the overlapping portions of the clouds will have a color that is a mix of the channel colors. For example, overlapping clouds in the images that are applied to the red and green channels will appear as a bright yellow region in the false-color image. Similarly, overlapping clouds in the images that are applied to the red and blue color channels will appear as a bright magenta region in the false-color image.

Because the shadows from clouds typically appear as low intensity pixels in the input images, the shadows will appear as regions having a color that is the opposite color of the clouds in the RGB color space. For example, shadows that are associated with clouds that appear as bright red regions will appear as dark cyan regions in the false-color image. Shadow regions associated with clouds that appear as bright blue regions in the false-color image will appear as dark yellow regions etc. By determining the intensity and color of the pixels in the false-color image, the processor can determine which of the input images contains an artifact such as a cloud or a shadow at that location.

The table below illustrates the resulting colors that will appear in the false-color image when three input images are supplied to different RGB color channels to produce the false-color image.

| Image | Image 1 (Red Ch.) | Image 2 (Green Ch.) | Image 3 (Blue Ch.) |
|---|---|---|---|
| Image 1 (Red Ch.) | cyan\Red | Yellow | Magenta |
| Image 2 (Green Ch.) | blue | magenta\Green | Cyan |
| Image 3 (Blue Ch.) | green | red | yellow\Blue |

The colors listed above the diagonal of the table are the bright colors of the cloud regions (capitalized) while the colors below the diagonal are the dark colors of the shadow regions. As can be seen, cloud and shadow regions in the false color image may have the same color. For example, a shadow in the image that is applied to the blue color channel of the false-color image appears as a yellow region. However overlapping cloud regions in the images that are applied to the green and red channel inputs also appear in the false-color image as a yellow region. The intensity of the pixels in the yellow color region and the solar angles are therefore used to distinguish shadow regions from cloud regions.

In one embodiment, those pixels in the false-color image that have a low intensity and gray color are deemed to be clear pixels. Those pixels that have a very intense color are determined to be cloud regions and those regions that have an intensity that are lower are shadows. The user may change the threshold values used by the processor to separate clear/shadow/cloud regions.

In some embodiments, pixels that represent shadows can also be located by determining if they are associated with nearby cloud pixels. As discussed above, shadow pixels have a color that is the opposite of the corresponding cloud color. For example, if a dark cyan pixel is located in the false-color image, then a corresponding bright red pixel should be located nearby. The distance and direction of the expected cloud pixel can be determined from the solar angle information that is included in the data for each aerial image. If a cloud pixel is located in the correct direction of a bright cloud pixel, then the pixel in question likely represents a shadow.

Figure 3:
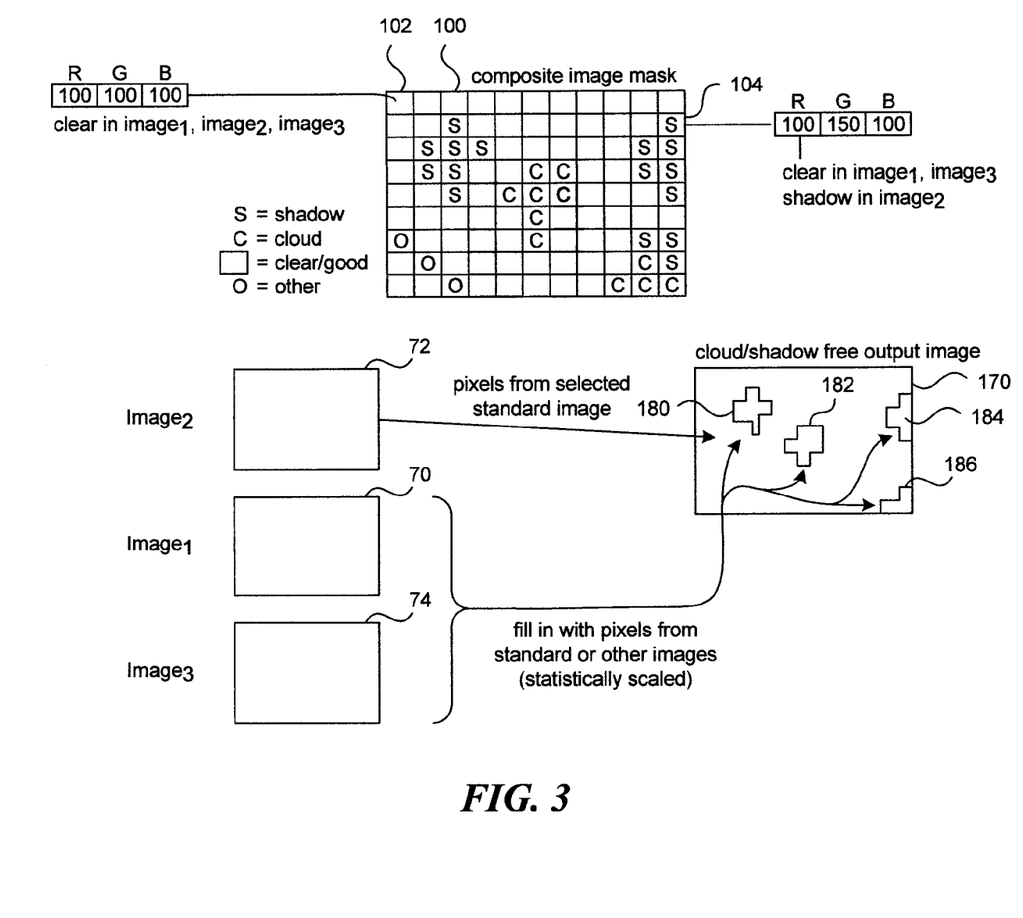
FIG. 3 illustrates a technique for creating artifact-free images of a region of interest in accordance with one embodiment of the disclosed technology.

FIG. 3 illustrates a composite image mask 100 that is created from the false-color composite image 80 shown in FIG. 2. In one embodiment of the disclosed technology, the composite image mask 100 contains a number of pixels each of which corresponds to one of the pixels in the false-color composite image 80. Each pixel in the composite image mask has a red, green, and blue color value that is coded to indicate whether the corresponding pixel of the input image for that channel represents a clear area, a shadow, a cloud or another artifact. In one embodiment, a clear pixel is coded as the number 100, a shadow pixel is coded as the number 150, a cloud pixel is coded as the number 200 and any other artifact (e.g., a contrail) is coded as the number 250. Those skilled in the art will recognize that other code values could be used. When viewed as a RGB image, those pixels representing clear areas will appear grey and those pixels representing artifacts will appear as brighter colors.

In the example shown in FIG. 3, a pixel 102 in the upper left hand corner of the composite image mask 100 stores a code for each of the input images supplied to the red, green, and blue color channels that make up a corresponding location in the false-color image. In the example shown, the pixel 102 has RGB values that are coded as 100, 100, 100 indicating that all the pixels in the input images at that location are clear. As another example, a pixel 104 in the upper right hand corner of the composite image mask has codes 100, 150, 100 indicating that the input image that is supplied to the green channel of the false-color image represents a shadow while the input images applied to the red and blue channel inputs are clear at that location. The codes associated with the pixels in the mask image are determined from the colors of the pixels in the false-color image.

By analyzing the codes stored for the pixels in the composite image mask, the processor determines which of the corresponding input images is clear at that location.

In one embodiment, the processor is programmed to analyze the composite image mask 100 for groups of pixels representing clouds or shadows. These artifacts may occur in polygons or other irregular shaped clusters. The edges of the polygons can be expanded outwards by a predefined number of pixels in order to ensure that all portions of the clouds, shadows and other artifacts are removed in the output image. In one embodiment, the processor applies a 3×3 mask over each pixel of the mask image. If a clear pixel at the center of the mask is adjacent to an artifact pixel, then the pixel in question can be converted into an artifact pixel as well. The details of such polygon expansion in image processing are considered to be well known to those of ordinary skill in the art.

To create the artifact-free output image, a user of the computer system selects one of the input images to be used as a standard or base image. For example, such an image may be selected by a user based on the number of clouds that appear in the image. Alternatively, the processor may be programmed to calculate the number of clouds that appear in each image and to select as the base image, the input image having the fewest number of clouds or the lowest percentage cloud cover.

Clear pixels from the selected base image are copied into the output image to complete a portion of the artifact-free output image. In the example shown, the second input image 72 is selected as the base image in order to create the artifact-free output image 170. To select pixel data from the base image, the programmed processor analyzes each pixel in the composite image mask 100 to select those pixels that have a clear pixel code for the selected base image. The band data from all of the bands of the base image is then copied into the output image at that pixel location. For example, if the input image 72 is selected as the base image and the image 72 is applied to the green color channel of the false-color composite image, the computer system analyzes the codes stored for the green channel of each pixel for the composite image mask.

As will be appreciated, a number of holes 180, 182, 184, 186 occur in the output image at locations corresponding to locations of clouds, shadows, or other artifacts in the selected base image. Therefore, the computer system analyzes the other input images to determine if the pixels that correspond to the location of the holes are clear. If so, data for the pixels from one of those images is added into the artifact-free output image 170.

As will be appreciated by those skilled in the art, the intensity statistics (e.g., mean, standard deviation, etc.) from the input images that are not selected as the base image may be adjusted to correspond to the intensity statistics of the selected standard image. In one embodiment, band data for a target pixel representing a hole in the output image is adjusted in accordance with the equation:

Target pixel=(source pixel−source mean)*target *std*/ source *std*+target mean where the source pixel is a pixel intensity data taken from another of the input images, the source mean is the mean intensity value from the other of the input images (calculated for each band) and the source std is the standard deviation of intensity values (for each band). Similarly, the target mean and target std are the mean values for each band and the standard deviation for each band in the output target image. In one embodiment, the image statistics are only calculated for overlapping regions of each input image that are artifact free. In one embodiment, these pixels can be located by searching the image mask for pixels having 100, 100, 100 or other codes indicating that all of the input images at a particular pixel location are clear.

Figure 4:
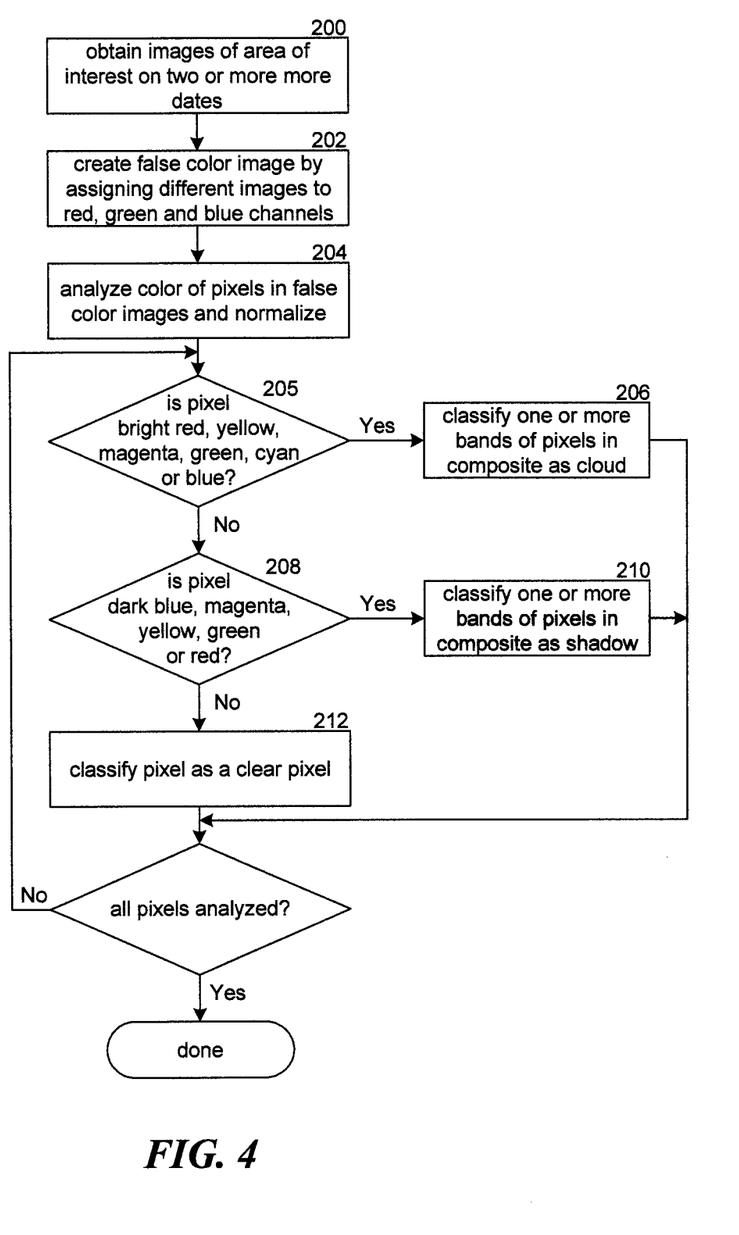
FIG. 4 is a flow diagram of steps performed by a programmed processor to create an image mask in accordance with one embodiment of the disclosed technology.

FIG. 4 is a flow diagram of steps performed by a programmed processor within the computer system to create an artifact-free output image from one or more temporally separated input images of a region of interest. Beginning at 200, the programmed processor system obtains two or more temporally spaced images of an area of interest. As indicated above, the times/dates when the input images were taken may be selected to be sufficiently far apart so that artifact patterns over the area of interest will likely have changed, but that the underlying vegetation or other objects in the region of interest will not have significantly changed in appearance.

At step 202, a false-color image is created by assigning different input images to the red, green, and blue channels of the false-color image. If three input images are used, each can be assigned to a different color channel. However, if only two input images are provided, one of the input images can be provided to two of the color channels. At 204, the processor analyzes the colors of the pixels in the false-color image to determine which of the images is artifact free at that particular location.

At 205, the processor analyzes whether the pixels are bright red, bright yellow, bright magenta, bright green, bright cyan, or bright blue. Such bright pixels are indicative of clouds in one or more of the input images. If so, the processor assigns a code representing a cloud to a pixel in a corresponding location in the composite image mask. The particular code assigned depends upon the color detected. For example, if the input image 70 is applied to the red channel input and a pixel at the corresponding location in the false-color image is bright red, then the pixel code for image 70 at that location in the composite image mask is classified as a cloud at 206.

At 208, the processor analyzes if a pixel is a dark blue, dark magenta, dark yellow, dark green or a dark red color. If so, that pixel is indicative of a shadow pixel and the corresponding pixel in the composite image mask is classified as a shadow pixel at 210. The particular code assigned depends upon the color of the pixel analyzed in the false-color image. If the answer at 208 is no, the processor classifies the pixel at the corresponding location in the composite image mask as being clear for each of the input images at 212. At 214, it is determined if all pixels have been analyzed in the false-color image. If so, processing is completed, if not, processing returns to step 204 for the next pixel in the false-color image.

Figure 5:
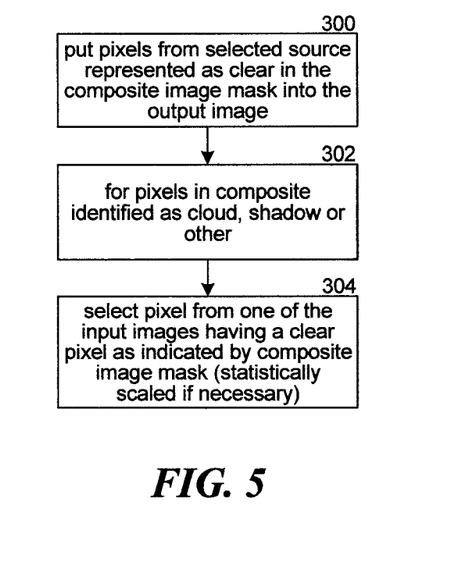
FIG. 5 is a flow diagram of steps performed by a programmed processor to remove artifacts from an aerial image in accordance with one embodiment of the disclosed technology.

FIG. 5 illustrates a series of steps performed by the programmed processor in order to create an artifact-free output image from a number of temporally displaced input images. Beginning at 300, the processor selects pixel data from a designated input image that are identified as being clear in the composite image mask, and copies the selected pixel data into the output image.

At 302, the computer system determines if there are one or more holes in the output image. Pixel data for the holes are selected from another one of the input images that has a pixel that is identified as being clear at the location of the hole. As indicated above, it may be necessary to statistically scale the band data values from the other selected input image to match the statistical characteristics of the selected source image. This process is repeated until each pixel for the holes in the output image has been selected from another of the two or more input images.

As will be appreciated, the disclosed technology offers a simple mechanism to create artifact-free images of an area of interest using two or more temporally displaced input images of the same region of interest. The artifact-free output image can be stored on a computer readable media for analysis at a later date, displayed on a monitor, printed on a printer or other output device, or can be transmitted to another computer system via a computer communication link.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, (i.e., one or more modules of computer program instructions, encoded on computer storage medium for execution by, or to control the operation of, data processing apparatus).

A computer storage medium can be, or can be included in, a non-transitory computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple chips, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or another unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory, or both. The essential elements of a computer are a processor for performing actions in accordance with instructions and one or more memory devices for storing instructions and data. Generally, a computer will also include, or be operatively coupled to receive data from, or transfer data to, or both, one or more mass storage devices for storing data, e.g., magnetic, magneto, or optical disks. However, a computer need not have such devices. Moreover, a computer can be embedded in another device, (e.g., a mobile telephone, a personal digital assistant (PDA), a mobile audio or video player, a game console, a Global Positioning System (GPS) receiver, or a portable storage device (e.g., a universal serial bus (USB) flash drive)), to name just a few. Devices suitable for storing computer program instructions and data include all forms of non volatile memory, media and memory devices, including by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A programmed computer system for removing artifacts from aerial images of a region of interest, including:
    a memory for storing program instructions that are executable by a processor;
    a processor configured to execute the stored program instructions in order to:
        receive two or more input aerial images of the region of interest that are obtained at different times;
        create a three-channel false color image by applying pixel data for a selected band of a first input aerial image to a red color channel of an RGB monitor, applying pixel data for the selected band of a second input aerial image to a green color channel of the RGB monitor and applying pixel data for the selected band of a third input aerial image to a blue color channel of the RGB monitor;
        identify pixels representing clear areas, clouds and shadows in the two or more input aerial images based on the color of the pixels in the false color image, wherein:
            pixels representing clear areas in the first, second or third input aerial images are identified by gray pixels in the false color image,
            pixels representing clouds in the first input aerial image are identified as pixels having a bright red color;
            pixels representing clouds in the second input aerial image are identified as pixels having a bright green color;
            pixel representing clouds in the third input aerial image are identified as pixels having a bright blue color;
            pixels representing overlapping clouds in the first and second input aerial images are identified as pixels having a bright yellow color;
            pixels representing overlapping clouds in the first and third input aerial images are identified as pixels having a bright magenta color;
            pixels representing overlapping clouds in the second and third input aerial images are identified as pixels having a bright cyan color; and wherein
            pixels representing shadows in the first input aerial image are identified as pixels having a dark cyan color and that are nearby pixels having a bright red color;
            pixels representing shadows in the second input aerial image are identified as pixels having a dark magenta color and that are nearby pixels having a bright green color;
            pixels representing shadows in the third input aerial image are identified as pixels having a dark yellow color and that are nearby pixels having a bright blue color;
            pixels representing overlapping shadows the first and second input aerial images are identified as pixels having a dark blue color and that are nearby pixels having a bright yellow color;
            pixels representing overlapping shadows the first and third input aerial images are identified as pixels having a dark green color and that are nearby pixels having a bright magenta color;
            pixels representing overlapping shadows the second and third input aerial images are identified as pixels having a dark red color and that are nearby pixels having a bright cyan color; and
        create an output image of the region of interest by selecting one of the first, second or third input aerial images and replacing pixels that represent cloud or shadow regions in the selected aerial image with pixels representing a clear area from the non-selected first, second or third input aerial images.

2. The programmed computer system of claim 1, further comprising: instructions that are executable by the processor to create a composite image mask having a number of pixels each of which corresponds to a pixel in the false color image, wherein the pixels in the image mask classify each pixel in the two or more input aerial images that create the false color image as representing a clear, cloud or shadow region.

3. The programmed computer system of claim 1, further comprising:
    instructions that are executable by the processor to compute a mean pixel value and standard deviation for each of the two or more input aerial images for overlapping areas that are identified as being free of clouds and shadows.

4. The programmed computer system of claim 1, further comprising:
    instructions that are executable by the processor to scale pixel values from the two or more input aerial images based on statistics of the output image and on statistics of the input image used to supply pixel data to the output image.

5. A non-transitory computer readable medium having instructions thereon that are executable by a, processor to remove artifacts from aerial images of a region of interest, by:
    receiving two or more input aerial images of the region of interest that are obtained at different times;
    creating a three-channel false color image by applying pixel data for a selected band of a first input aerial image to a red color channel of an RGB monitor, applying pixel data for the selected band of a second input aerial image to a green color channel of the RGB monitor and applying pixel data for the selected band of a third input aerial image to a blue color channel of the RGB monitor;
    identifying pixels representing clear areas, clouds and shadows in the two or more input aerial images based on the color of the pixels in the false color image, wherein:
        pixels representing clear areas in the first, second or third input aerial images are identified by gray pixels in the false color image,
        pixels representing clouds in the first input aerial image are identified as pixels having a bright red color;
        pixels representing clouds in the second input aerial image are identified as pixels having a bright green color;
        pixels representing clouds in the third input aerial image are identified as pixels having a bright blue color;
        pixels representing overlapping clouds in the first and second input aerial images are identified as pixels having a bright yellow color;
        pixels representing overlapping clouds in the first and third input aerial images are identified as pixels having a bright magenta color;

pixels representing overlapping clouds in the second and third input aerial images are identified as pixels having a bright cyan color; and wherein pixels representing shadows in the first input aerial image are identified as pixels having a dark cyan color and that are nearby pixels having a bright red color;

pixels representing shadows in the second input aerial image are identified as pixels having a dark magenta color and that are nearby pixels having a bright green color;

pixels representing shadows in the third input aerial image are identified as pixels having a dark yellow color and that are nearby pixels having a bright blue color;

pixels representing overlapping shadows the first and second input aerial images are identified as pixels having a dark blue color and that are nearby pixels having a bright yellow color;

pixels representing overlapping shadows the first and third input aerial images are identified as pixels having a dark green color and that are nearby pixels having a bright magenta color;

pixels representing overlapping shadows the second and third input aerial images are identified as pixels having a dark red color and that are nearby pixels having a bright cyan color; and create an output image of the region of interest by selecting one of the first, second or third input aerial images and replacing pixels that represent cloud or shadow regions in the selected aerial image with pixels representing a clear area from the non-selected first, second or third input aerial images.

* * * * *